(12) United States Patent
Yi et al.

(10) Patent No.: US 10,416,455 B2
(45) Date of Patent: Sep. 17, 2019

(54) HEAD MOUNTED DISPLAY

(71) Applicant: LG ELECTRONICS INC., Seoul (KR)

(72) Inventors: Sunghyun Yi, Seoul (KR); Hangyu Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/575,263

(22) PCT Filed: Sep. 7, 2015

(86) PCT No.: PCT/KR2015/009423
§ 371 (c)(1),
(2) Date: Nov. 17, 2017

(87) PCT Pub. No.: WO2016/186257
PCT Pub. Date: Nov. 24, 2016

(65) Prior Publication Data
US 2018/0157043 A1 Jun. 7, 2018

(30) Foreign Application Priority Data
May 20, 2015 (KR) .................. 10-2015-0070544

(51) Int. Cl.
*G02B 27/01* (2006.01)
*G06F 3/01* (2006.01)
(Continued)

(52) U.S. Cl.
CPC ..... *G02B 27/0172* (2013.01); *G02B 27/0176* (2013.01); *G06F 1/163* (2013.01);
(Continued)

(58) Field of Classification Search
CPC ............ G02B 27/0172; G02B 27/0176; G02B 2027/0178; H04N 13/117; H04N 13/344; H04N 2213/001; G06F 3/011
(Continued)

(56) References Cited

U.S. PATENT DOCUMENTS 6,161,915 A * 12/2000 Bolash ................. B41J 2/17546
347/19
2009/0295683 A1 12/2009 Pugh et al.
(Continued)

FOREIGN PATENT DOCUMENTS

CN 104777617 A * 7/2015
JP 7-104210 A 4/1995
(Continued)

*Primary Examiner* — Mark Edwards
(74) *Attorney, Agent, or Firm* — Birch, Stewart, Kolasch & Birch, LLP

(57) ABSTRACT

The present invention provides a head mounted display comprising: a frame which is wearable on a user's head; a display unit which is mounted to the frame so as to output screen information; a lens module which is detachably inserted into the frame and includes a pair of lenses having a predetermined refractive index so as to form a virtual image of the screen information; a sensing unit which senses the lens module inserted into the frame; and a control unit which controls the screen information on the basis of the type of the sensed lens module.

18 Claims, 14 Drawing Sheets

(51) Int. Cl.
*G06F 1/16* (2006.01)
*H04N 13/117* (2018.01)
*H04N 13/344* (2018.01)

(52) U.S. Cl.
CPC ........... *G06F 3/011* (2013.01); *H04N 13/117* (2018.05); *H04N 13/344* (2018.05); *G02B 2027/0178* (2013.01); *H04N 2213/001* (2013.01)

(58) Field of Classification Search
USPC ............................................................. 348/8
See application file for complete search history.

(56) References Cited

U.S. PATENT DOCUMENTS

| | | | | |
|---|---|---|---|---|
| 2010/0039270 A1* | 2/2010 | Lin | .................... | G01M 11/0207 340/600 |
| 2010/0164840 A1 | 7/2010 | Yamamoto | | |
| 2011/0234476 A1* | 9/2011 | Sugihara | ............ | G02B 27/0172 345/8 |
| 2015/0278720 A1* | 10/2015 | Nye | ..................... | G06Q 10/063 705/7.11 |
| 2015/0326965 A1* | 11/2015 | Sprague | ................ | G10L 13/043 381/317 |
| 2016/0131915 A1* | 5/2016 | Grealy | ................ | G02B 25/002 359/804 |
| 2016/0253006 A1* | 9/2016 | Lyons | ................ | G02B 27/0172 345/174 |

FOREIGN PATENT DOCUMENTS

| | | |
|---|---|---|
| JP | 7-168118 A | 7/1995 |
| JP | 9-503595 A | 4/1997 |
| JP | 2009-88575 A | 4/2009 |
| KR | 10-2007-0104960 A | 10/2007 |
| KR | 10-2012-0079421 A | 7/2012 |

\* cited by examiner (a)

(b)

HEAD MOUNTED DISPLAY

CROSS REFERENCE TO RELATED APPLICATIONS

This application is the National Phase of PCT International Application No. PCT/KR2015/009423, filed on Sep. 7, 2015, which claims priority under 35 U.S.C. 119(a) to Patent Application No. 10-2015-0070544, filed in Republic of Korea on May 20, 2015, all of which are hereby expressly incorporated by reference into the present application.

BACKGROUND OF THE INVENTION

1. Field of the Invention

The present disclosure relates to a head mounted display including a lens module capable of changing a virtual image of screen information.

2. Description of the Related Art

Terminals may be divided into glasses-type terminals (mobile/portable terminals) and stationary terminals according to their mobility. Glasses-type terminals may also be classified as handheld terminals or vehicle mounted terminals according to whether or not a user can directly carry the terminal.

As it becomes multifunctional, a mobile terminal can be allowed to capture still images or moving images, play music or video files, play games, receive broadcast and the like, so as to be implemented as an integrated multimedia player. Moreover, in order to support and enhance the functions of the terminal, the improvement of structural and software elements of the terminal may be taken into consideration.

Wearable glasses-type terminals formed to be mountable on a part of a human body have been recently developed. A glasses-type terminal mounted on a head of a user may correspond to a head mounted display (HMD). A display unit 151 provided in a glasses-type terminal such as an HMD may be combined with augmented reality technology, N-screen technology and the like beyond a simple image output function to provide a variety of conveniences to the user.

In recent years, various functions are implemented, and screen information output in various angles of view according to various functions is provided by the head mounted display unit 151. However, since the screen information output on the display unit 151 is formed at a preset angle of view due to a refractive index of a lens, an image for screen information cannot be formed at various sizes and positions.

SUMMARY OF THE INVENTION

Accordingly, a technical task of the present disclosure is to provide a head mounted display in which a lens module having a different refractive index can be mounted in a detachable manner.

In order to accomplish such a task of the present disclosure, a head mounted display according to an embodiment of the present disclosure may include a frame formed to be mountable on a head of a user, a display unit mounted on the frame to display screen information, a lens module configured to be detachably inserted into the frame, and provided with a pair of lenses having a preset refractive index to form a virtual image of the screen information, a sensing unit configured to sense the lens module inserted into the frame, and a controller configured to control the screen information based on the type of the sensed lens module.

In an example of the present disclosure, the lens module may include a body portion formed to be insertable into the frame, a lens mounted on the body portion, and a guide protrusion for guiding a direction of insertion into the frame.

In an example of the present disclosure, the head mounted display may include a first sensing module formed on the lens module and a second sensing module mounted on the frame to sense the movement of the first sensing module, thereby sensing the presence of the lens module and the type of the lens module. Accordingly, it may be possible to control the activation of the display unit and control the display state of the screen information on the display unit based on the mounting of the lens module, without a user's additional control command.

For an example related to the present disclosure, it may be possible to control a number of pixels constituting substantially the same screen information based on the type of the lens module, thereby improving the quality of an image recognized by the user.

According to the present disclosure, it may be possible to display an image corresponding to an operation mode in a suitable state for each function in a glasses-type terminal in which various operation modes for performing different functions are activated. Specifically, an image with a different size may be formed according to the characteristics of visual information, and displayed at different positions, thereby allowing the user to receive an image in a suitable environment.

In addition, a lens module being inserted may be sensed and activated without the user's control command, and thus it may not be necessary for the user to input a control command for activating an operation mode as well as insert or replace the lens module in order to display screen information according to the activated operation mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
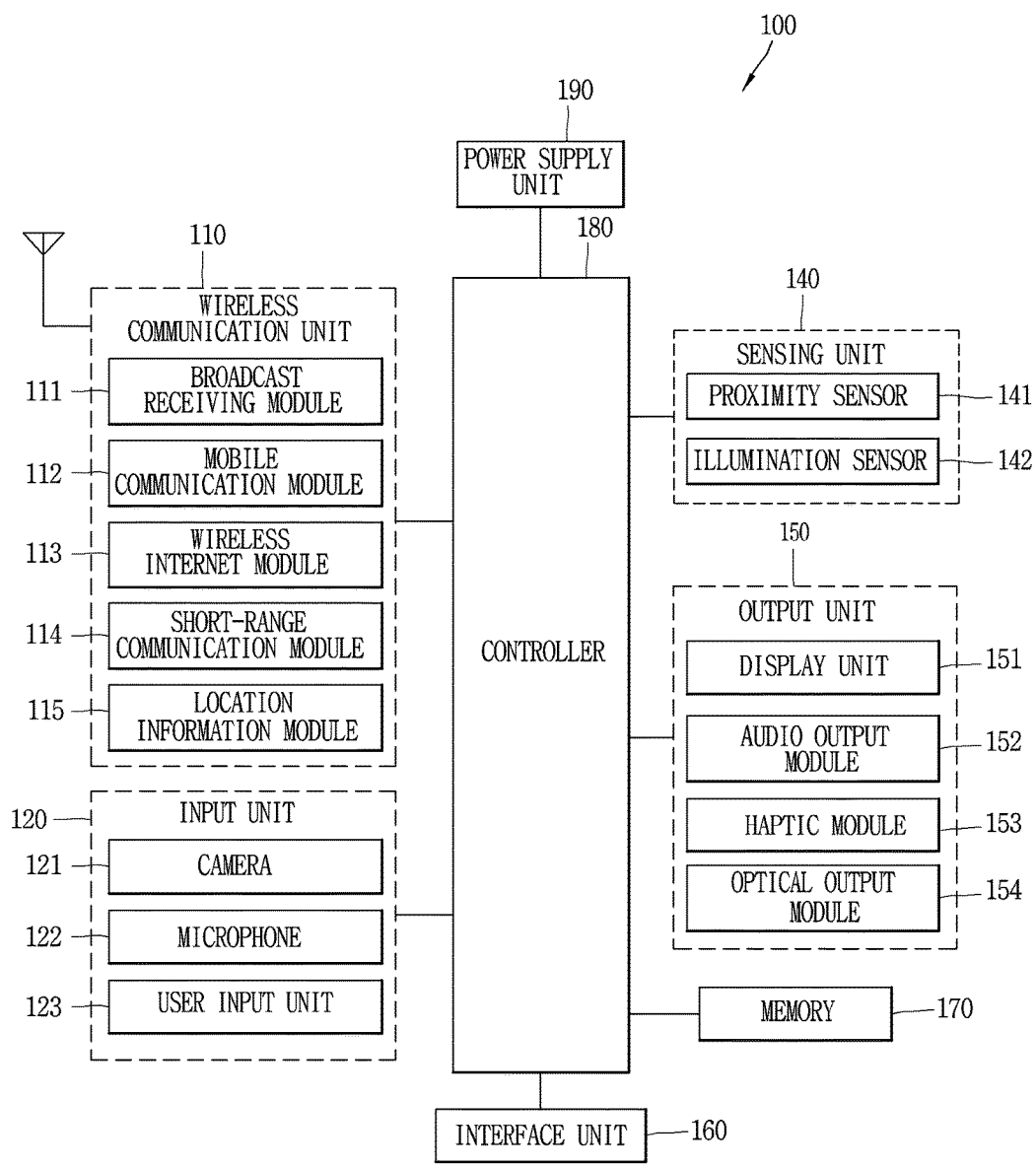
FIG. 1 is a block diagram for explaining a head mounted display (HMD) associated with the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the concept of the invention, and therefore, they should not be construed to limit the technological concept disclosed herein by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

FIG. 1 is a block diagram for explaining a head mounted display (HMD) associated with the present disclosure.

The HMD 100 may include a wireless communication unit 110, an input unit 120, a sensing unit 140, an output unit 150, an interface unit 160, a memory 170, a controller 180, a power supply unit 190, and the like. The constituent elements illustrated in FIG. 1 may not be necessarily required, and the HMD described in the present disclosure may have a greater or less number of elements than those illustrated elements.

More specifically, of the foregoing constituent elements, the wireless communication unit 110 may include at least one module capable of performing wireless communication between the HMD 100 and a wireless communication system, between the HMD 100 and another HMD 100, between the HMD 100 and a mobile or stationary terminal, between the HMD 100 and a control apparatus, between the HMD 100 and a camera installed at an outside thereof to perform wireless communication or between the HMD 100 and an external server.

In addition, the wireless communication unit 110 may include one or more modules for connecting the HMD 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 is typically implemented using one or more sensors configured to sense internal information of the HMD, the surrounding environment of the HMD, user information, and the like. For example, the sensing unit 140 may include a proximity sensor 141, an illumination sensor 142, a touch sensor, an acceleration sensor, a magnetic sensor, (G-sensor), gyroscope sensor, motion sensor, RGB sensor, infrared sensor (IR sensor: An infrared sensor, a finger scan sensor, an ultrasonic sensor, an optical sensor (for example, see camera 121), a microphone (see 122), a battery gauge). An environmental sensor (for example, a barometer, a hygrometer, a thermometer, a radiation sensor, a heat sensor, a gas sensor, etc.), a chemical sensor (e.g., an electronic nose, a healthcare sensor, One may be included. On the other hand, the HMD disclosed herein may utilize information in such a manner of combining information sensed by at least two sensors of those sensors.

The output unit 150 may be configured to output an audio signal, a video signal or a tactile signal. The output unit 150 may include a display unit 151, an audio output unit 152, a haptic module 153, an optical output unit 154 and the like.

The interface unit 160 serves as an interface with various types of external devices that can be coupled to the HMD 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The HMD 100 may execute an appropriate control related to a connected external device, in response to the external device being connected to the interface unit 160.

In addition, the memory 170 stores data supporting various functions of the HMD 100. The memory 170 is typically implemented to store data to support various functions or features of the HMD 100. For instance, the memory 170 may be configured to store application programs executed in the HMD 100, data or instructions for operations of the HMD 100, and the like. At least some of those application programs may be downloaded from an external server via wireless communication. Some others of those application programs may be installed within the HMD 100 at the time of being shipped for basic functions of the HMD 100 (for example, displaying screen information such as an image or video, receiving a call, placing a call, receiving a message, sending a message, etc.). On the other hand, the application programs may be stored in the memory 170, installed in the HMD 100, and executed by the controller 180 to perform an operation (or a function) of the HMD 100.

The controller 180 may typically control an overall operation of the HMD 100 in addition to the operations related to the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the HMD 100 for operation.

The power supply unit 190 may receive external power or internal power and supply appropriate power required for operating respective elements and components included in the portable HMD 100 under the control of the controller 180. The power supply unit 190 may include a battery, and the battery may be an embedded battery or a replaceable battery.

At least part of those elements and components may be combined to implement operation and control of the HMD or a control method of the HMD according to various exemplary embodiments described herein. Furthermore, the operation and control or the control method of the HMD may be implemented in the HMD in such a manner of activating at least one application program stored in the memory 170.

Hereinafter, each aforementioned component will be described in more detail with reference to FIG. 1, prior to explaining various exemplary embodiments implemented by the HMD 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the HMD 100 to simultaneously receive at least two broadcast channels or switch the broadcast channels.

The broadcast managing entity may indicate a server that generates and transmits a broadcast signal and/or broadcast associated information or a server that receives a previously generated broadcast signal and/or broadcast associated information and sends them to an HMD or a device connected to the HMD to control the HMD (e.g., control apparatus, terminal, etc.). The broadcast signal may be implemented as a TV broadcast signal, a radio broadcast signal, and a data broadcast signal, among others.

The broadcast signal may be encoded according to at least one of technical standards (or transmission methods, for example, ISO, IEC, DVB, ATSC, etc.) for transmission and reception of digital broadcast signals. The broadcast receiving module 111 may receive the digital broadcast signals using a method appropriate for a technical specification defined in the technical standards.

The broadcast signal may further include a data broadcast signal combined with a TV or radio broadcast signal. The broadcast associated information may also be provided through a mobile communication network. In this case, it may be received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a memory 170.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

The wireless signals may include audio call signal, video (telephony) call signal, or various formats of data according to transmission/reception of text/multimedia messages.

The wireless Internet module 113 refers to a module for supporting wireless Internet access, and may be built-in or externally installed on the HMD 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short range communication module 114 may support wireless communication between the HMD 100 and a wireless communication system, between the HMD 100 and another HMD 100, between the HMD 100 and a mobile or stationary terminal, between the HMD 100 and a control device, between the HMD 100 and a camera installed outside to perform wireless communication or between the HMD 100 and an external server, via wireless area networks. The short-range communication module 114 denotes a module for short-range communications.

Here, the HMD may be a device (e.g., a mobile phone, a smart phone, a smartwatch, a notebook computer, a control device, etc.) capable of exchanging data (or connecting)

with the HMD 100 according to the present disclosure. The short-range communication module 114 may sense (recognize) a device capable of communicating with the HMD 100 near the HMD 100. Moreover, when the sensed device is a device authenticated to communicate with the HMD 100 according to the present disclosure, the controller 180 may transmit at least a part of the data processed in the HMD 100 through the short-range communication device 114, and transmit at least a part of the data processed by the device to the HMD 100.

Accordingly, the user of the HMD 100 may use data processed in the device through the HMD 100. For example, as a result, the user may perform a phone call through the HMD 100 when a call is received at the device or check the received message through the HMD 100 when a message is received at the device.

The location information module 115 is a module for acquiring a position (current position) of the HMD, and a representative example thereof includes a Global Position System (GPS) module or WiFi (Wireless Fidelity) module. For example, when the HMD uses the GPS module, a position of the HMD may be acquired using a signal sent from a GPS satellite. As another example, when the HMD uses the Wi-Fi module, a position of the HMD may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the HMD. As a module used to acquire the location (or current location) of the HMD, the location information module 115 may not be necessarily limited to a module for directly calculating or acquiring the location of the HMD.

Next, the input unit 120 may be configured to provide image information (or signal), audio information (or signal), data, or enter information received from the user, and may include one or a plurality of cameras 121 to enter image information. The camera 121 processes a image frame, such as still picture or video, obtained by an image sensor in a video phone call or image capturing mode. The processed image frames may be displayed on the display unit 151. On the other hand, the plurality of cameras 121 disposed in the HMD 100 may be arranged in a matrix configuration. By use of the cameras 121 having the matrix configuration, a plurality of image information having various angles or focal points may be input into the HMD 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the HMD 100 (or an application program being executed). On the other hand, the microphone 122 may include assorted noise removing algorithms to remove noise generated in the course of receiving the external audio signal.

The user input unit 123 may receive information input by a user. When information is received through the user input unit 123, the controller 180 may control an operation of the HMD 100 to correspond to the input information. The user input unit 123 may include a mechanical input element (or a mechanical key, for example, a button located on a front/rear surface or a side surface of the HMD 100, a dome switch, a jog wheel, a jog switch, etc.), and a touch-sensitive input means. As an example, the touch-sensitive input means may be at least one of a touch pad and a touch panel.

On the other hand, the sensing unit 140 may sense at least one of internal information of the HMD, surrounding environment information of the HMD and user information, and generate a sensing signal corresponding to it. The controller 180 may control an operation of the HMD 100 or execute data processing, a function or an operation related to an application program installed in the HMD based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the HMD covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch-sensitive input means of the user input unit 123 is a capacitive type, the proximity sensor 141 may be configured to detect sense the proximity of an object due to a change of an electromagnetic field according to the proximity of the object having a conductivity. In this case, the user input unit 123 itself may be classified into a proximity sensor.

On the other hand, for the sake of convenience of explanation, a state that the pointer is positioned to be proximate onto the user input unit 123 without contact will be referred to as "proximity touch," whereas a state that the pointer substantially comes in contact with the user input unit 123 will be referred to as "contact touch." For the position corresponding to the proximity touch of the pointer on the user input unit 123, such position will correspond to a position where the pointer faces perpendicular to the user input unit 123 upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and display visual information corresponding to the processed data on the display unit 151. In addition, the controller 180 may control the HMD 100 to execute different operations or process different data (or information) according to whether a touch with respect to the same point on the user input unit 123 is either a proximity touch or a contact touch.

A touch sensor may sense a touch (or touch input) applied onto the user input unit 123 using at least one of various types of touch methods, such as a resistive type, a capacitive type, an infrared type, a magnetic field type, and the like.

As one example, the touch sensor may be configured to convert changes of pressure applied to a specific part of the user input unit 123 or a capacitance occurring from a specific part of the user input unit 123, into electric input signals. The touch sensor may be configured to detect a position, an area when a touch object applying a touch to the user input unit 123 is touched on the touch sensor, a pressure at the time of touch, a capacitance at the time of touch, and the like. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the user input unit 123 has been touched. Here, the touch controller may be a component separate from the controller 180 or the controller 180 itself.

On the other hand, the controller 180 may perform a different control or perform the same control according to the type of the touch object that touches the user input unit 123. Whether to execute the different control or the same control according to the object which gives a touch input may be decided based on a current operating state of the HMD 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like, to the user input unit 123.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

On the other hand, the camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The camera 121 and the laser sensor may be combined to detect a touch of the sensing object with respect to a 3D stereoscopic image. More specifically, the photo sensor is integrated with photo diodes and transistors in the rows and columns thereof, and a content placed on the photo sensor may be scanned by using an electrical signal that is changed according to the amount of light applied to the photo diode. Namely, the photo sensor may calculate the coordinates of the sensing object according to variation of light to thus obtain position information of the sensing object.

The display unit 151 may display (output) information processed in the HMD 100. For example, the display unit 151 may display execution screen information of an application program driven in the HMD 100 or user interface (UI) and graphic user interface (GUI) information in response to the execution screen information.

Furthermore, the display unit 151 may be configured with a stereoscopic display unit 151 for displaying a stereoscopic image.

A stereoscopic method (glasses method), an auto-stereoscopic method (no-glasses method), a projection method (holographic method), and the like may be applicable to the stereoscopic display unit 151.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

Also, as for a 3D thumbnail image, a left image thumbnail and a right image thumbnail may be generated from a left image and a right image of an original image frame, respectively, and then combined to generate a single 3D thumbnail image. In general, thumbnail refers to a reduced image or a reduced still image. The thusly generated left image thumbnail and the right image thumbnail may be displayed with a horizontal distance difference therebetween by a depth corresponding to the disparity between the left image and the right image on the screen, providing a stereoscopic space sense.

A left image and a right image required to implement a 3-dimensional stereoscopic image are displayed on the stereoscopic display unit 151 by a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. Also, the audio output unit 152 may also provide audible output signals related to a particular function (e.g., a call signal reception sound, a message reception sound, etc.) performed by the HMD 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller 180. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a a head, a face, a finger or a hand. The haptic module 153 may be implemented in two or more in number according to the configuration of the HMD 100.

An optical output module 154 may output a signal for indicating an event generation using light of a light source of the HMD 100. Examples of events generated in the HMD 100 may include a message reception, a call signal reception, a missed call, an alarm, a schedule notice, an email reception, an information reception through an application, displaying an image (or video) and the like. In other words, the light output unit 154 may notify that the HMD 100 is performing a specific operation (function) by the user.

A signal output by the optical output module 154 may be implemented in such a manner that the HMD emits monochromatic light or light with a plurality of colors. The signal output may be terminated based on whether the HMD detects the user's event confirmation or ends the operation being performed in the HMD.

The interface unit 160 serves as an interface for external devices to be connected with the HMD 100. The interface unit 160 may allow a data reception from an external device, a power delivery to each component in the HMD 100, or a data transmission from the HMD 100 to an external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

On the other hand, the identification module may be configured as a chip for storing various information required to authenticate an authority to use the HMD 100, which may include a User Identity Module (UIM), a Subscriber Identity Module (SIM), and the like. In addition, the device having the identification module (also referred to herein as an "identifying device") may take the form of a smart card. Accordingly, the identifying device may be connected with the terminal 100 via the interface unit 160.

Furthermore, the interface unit 160 may serve as a path for power to be supplied from an external cradle to the HMD 100 when the HMD 100 is connected to the external cradle or as a path for transferring various command signals inputted from the cradle by a user to the HMD 100. Such various command signals or power inputted from the cradle may operate as signals for recognizing that the HMD 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the HMD 100 may operate in association with a web storage which performs the storage function of the memory 170 on the Internet.

As aforementioned, the controller 180 may typically control the general operations of the HMD 100. For example, the controller 180 may set or release a lock state for restricting a user from inputting a control command with respect to applications when a state of the HMD meets a preset condition.

Furthermore, the controller 180 may also perform controlling and processing related to voice calls, data communications, video calls, and the like, or perform pattern recognition processing to recognize a handwriting input or a picture drawing input performed on the user input unit 123 as characters or images, respectively. In addition, the controller 180 may control one or combination of those components in order to implement various exemplary embodiment disclosed herein on the HMD 100.

The power supply unit 190 may receive external power or internal power and supply appropriate power required for operating respective elements and components included in the HMD 100 under the control of the controller 180. The power supply unit 190 may include a battery, which is typically rechargeable or be detachably coupled to the HMD body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

On the other hand, various embodiments described herein may be implemented in a computer-readable or its similar medium using, for example, software, hardware, or any combination thereof.

Figure 2A:
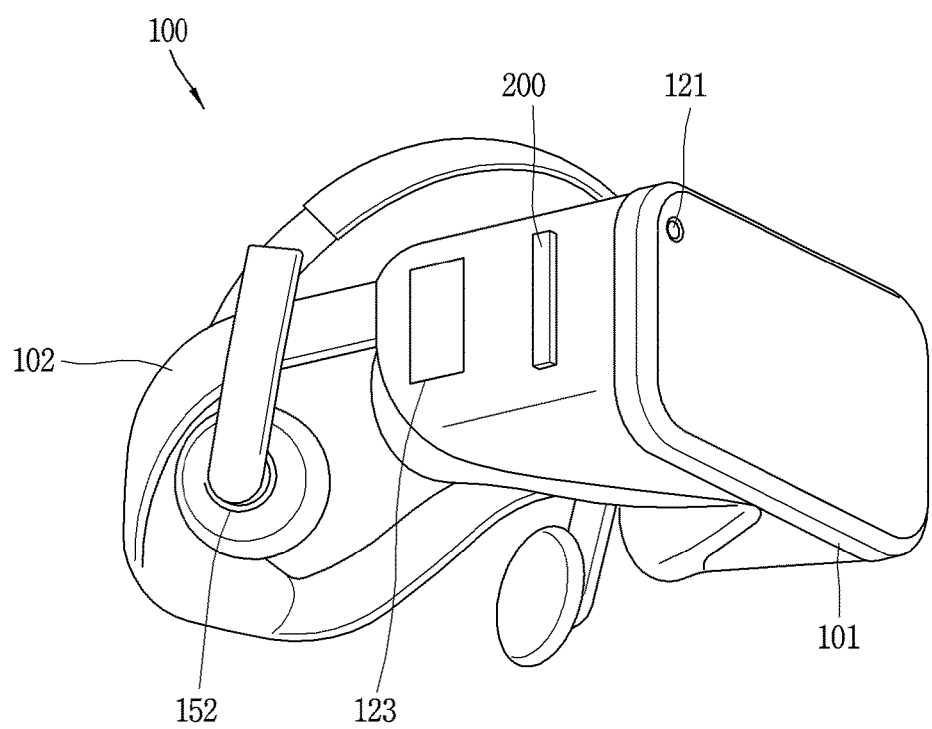
FIG. 2A is a conceptual view in which an HMD associated with the present disclosure is viewed from one direction.
Figure 2B:
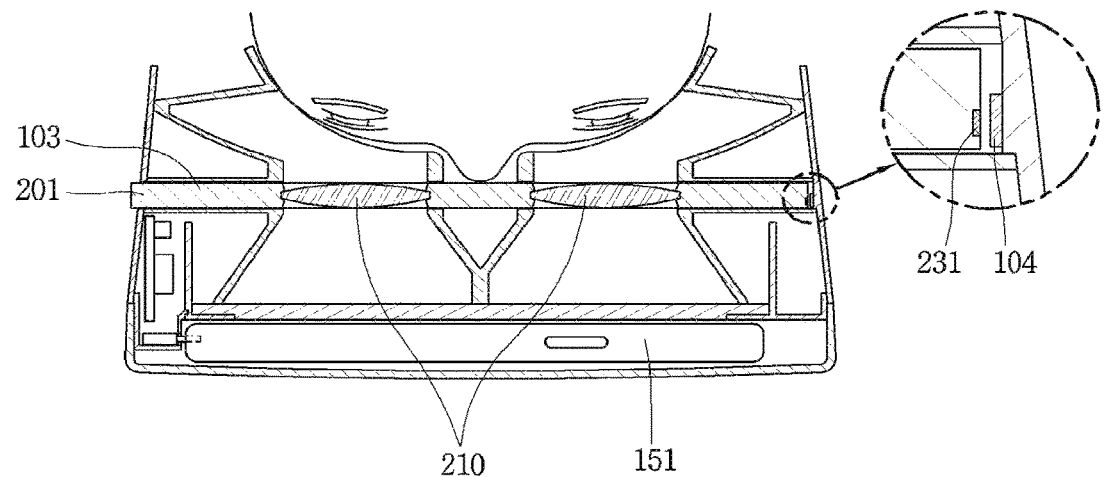
FIG. 2B is a cross-sectional view in which the HMD of FIG. 2A is cut in one direction.

FIG. 2A is a conceptual view in which an HMD associated with the present disclosure is viewed from one direction. FIG. 2B is a cross-sectional view in which the HMD of FIG. 2A is cut in one direction.

Referring to FIG. 2A, the HMD 100 associated with the present disclosure may be formed to be worn on a head portion (or head, face) of a human body, and may include a frame unit (case, housing, cover, etc.) for the same. The frame unit may be formed of a flexible material to facilitate wearing. It is illustrated in the drawing that the frame unit includes a first frame 101 and a second frame 102 with different materials.

For an example, the first frame 101 may perform the role of providing a space in which at least one of constituent elements that will be described in FIG. 1 can be disposed, and the second frame 202 may perform the role of supporting (or fixing) the first frame 201 to be mounted on a head portion of a human body.

The frame unit may be referred to as a main body (or HMD main body) or body (or HMD body). Here, the HMD main body (or HMD body) may be regarded the HMD 100 as at least one congregate and thus understood to have a concept referring to this.

The frame may be supported on the head and defines a space for mounting various components. As illustrated in the drawing, electronic components such as a camera 121, an output unit, a user input unit 123, a controller 180, a sensing unit, and the like may be mounted on the first frame 101. Here, the display unit 151 may be formed to cover at least one of the user's left and right eyes (or to face at least one of the user's left and right eyes), and formed in a detachable manner.

An electronic component such as an audio output unit 152 or the like may be mounted on the second frame 102. However, the present disclosure may not be necessarily limited to this, and constituent elements that will be described below in FIG. 1 and constituent elements required for the HMD may be disposed in various ways on the first frame 101 and second frame 102 by a user's selection.

The controller 180 (refer to FIG. 1) is configured to control various electronic components included in the HMD 100. The controller 180 may be understood to have a configuration corresponding to the controller 180 that will be described below in FIG. 1.

The camera 121 may be located adjacent to either or both of the left and right eyes to capture an image. The camera 121 may be disposed adjacent to eyes to face a front side, and thus the camera 121 may acquire a scene viewed by a user as an image.

According to the drawing, it is illustrated that one camera 121 is provided therein, but present disclosure may not be necessarily limited to this. The camera 121 may be provided with a plural number to acquire a stereoscopic image.

The HMD 100 may include the user input unit 123 manipulated by the user to receive a control command. The user input unit 123 may employ any method if it is a tactile manner allowing the user to perform manipulation with a tactile feeling such as touch, push, or the like. The drawing illustrates a view in which the user input unit 123 operable in a pushing manner and a touching manner are disposed on the frame unit.

Furthermore, the HMD 100 may include a microphone (not shown) which processes input sound into electric audio data, and an audio output unit 152 for outputting an audible sound. The audio output unit 152 may be configured to transfer the audible sound in a general audio output manner or an osteoconductive manner. When the audio output unit 152 is implemented in the osteoconductive manner, the audio output unit 152 may be closely adhered onto the head portion when the user wears the HMD 100 and vibrate the user's skull to transfer sounds.

The display unit 151 may be mounted into the frame unit to perform the role of displaying screen information (for example, image, video, etc.) in front of the user's eyes. The display unit 151 may be disposed to correspond to at least one of the left and right eyes to display screen information in front of the user's eyes when the user wears the HMD 100. According to one embodiment, the display unit 151 may include a left eye panel and a right eye panel for outputting a left eye image and a right eye image, respectively.

Referring to FIG. 2B, the image output through the display unit 151 may be viewed while overlapping with the general visual field. The HMD 100 may provide augmented reality (AR) in which a virtual image overlaps with an image or background of reality using the characteristics of the display to show one image. In the present drawing, it is illustrated that the display unit 151 is positioned to cover both the left and right eyes so that an image can be output toward both the left and right eyes of the user.

The present disclosure includes a lens module 200 for refracting screen information displayed from the display unit 151 into an enlarged virtual image, and the lens module according to the present disclosure is formed in a detachable manner to provide various images by lenses having various refractive indices. Hereinafter, the structure of the lens module formed in a detachable manner will be described in detail.

Figure 2C:
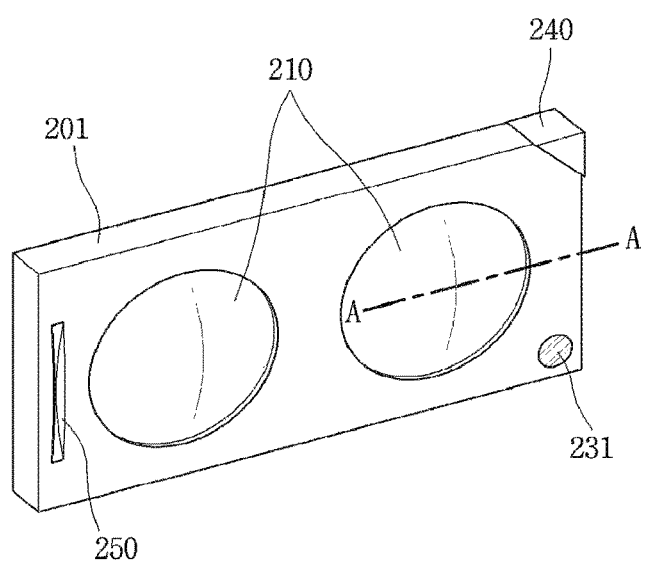
FIGS. 2C through 2E are conceptual views for explaining a lens module according to an embodiment.

FIG. 2B is a cross-sectional view in which the HMD of FIG. 2A cut in one direction, and FIG. 2C is a conceptual view for explaining a lens module according to an embodiment.

Referring to 2A through 2C, the lens module 200 may be inserted into the first frame 101 and drawn out from the first frame 101 by an external force.

The first frame 101 includes an accommodation space 103 for accommodating the lens module 200. An opening portion communicating with the accommodation space 103 is formed in one region of the first frame 101.

The lens module 200 is inserted into the accommodation space 103 through the opening portion. For example, one end portion of the lens module 200 may be accommodated in a state of being protruded from the accommodation space 103. Accordingly, the user may apply an external force to one region of the protruded lens module 200 to take out the lens module 200 from the accommodation space 103. However, the present disclosure may not be limited thereto, and when the lens module 200 is completely accommodated in the accommodation space 103, and an external force is applied to the lens module 200 in an accommodated state, the lens module 200 may be formed to be ejected from the accommodation space 103.

The first frame 101 may further include a withdrawal structure (not shown) for withdrawing the lens module 200. For example, the withdrawal structure (not shown) may be configured with an elastic member that provides an elastic force in an opposite direction when an external force is applied to the lens module 200 in an inward direction of the accommodation space 103 while the lens module 200 is inserted into the first frame 101.

The lens module 200 is overlapped with the display unit 151 within the first frame 101. The lens module 200 mounted on the first frame 101 is positioned between the user's eyes and the display unit 151 in a state where the head mounted display 100 is mounted on the user's head or the like. The lens module 200 is separated from the display unit 151 by a preset distance.

Referring to FIG. 2C, the lens module 200 includes a body portion 201, a lens 210, a guide protrusion 240, and a magnet 231. The body portion 201 is formed in a plate shape and corresponds to the shape of the accommodation space 103. When a part of the body portion 201 is protruded from the accommodation space 103, a length of the body portion 201 is preferably formed to be larger than the accommodation space 103. Alternatively, a length of the body portion 201 may be substantially the same as that of the accommodation space 103, and may further include a structure that protrudes outward due to an external force.

The lens module 200 includes a pair of lenses 210. The refractive indices of the pair of lenses 210 may be formed to be the same, but the present disclosure is not limited thereto.

The lens 210 is formed of a lens having a preset refractive index, and the lens module 200 is disposed such that the display unit 151 is positioned within a focal distance of the lens 210. Accordingly, the image corresponds to an enlarged virtual image.

The enlarged virtual image is formed at a position spaced apart from the user while the user wears the head mounted display 100.

The enlarged virtual image determines a field of view (FOV) of a preset virtual image based on the refractive index of the lens 210. In other words, a size of the virtual image and a position of the virtual image are adjusted by the refractive index of the lens 210.

The body portion 201 includes a pair of opening regions. The pair of lenses 210 are mounted on the pair of opening regions. A thickness of the body portion 201 is formed to be greater than or equal to that of the lens 210. Accordingly, when the lens module 200 is inserted into the accommodation space 103, a friction between the lens 210 and the first frame 101 may be minimized to minimize the damage of the lens 210.

Although not shown in the drawing, the lens module 200 may further include a protective layer (not shown) formed to cover both sides of the lens 210.

A groove 250 may be formed at one end portion of the body portion 201, and the guide protrusion 240 may be formed at the other end of the body portion 201. The groove 250 is formed in a region exposed to the outside when the body portion 201 is accommodated in the accommodation space 103 so that the user can apply a force for withdrawing the body portion 210 from the accommodation space 103 using the groove 250.

The guide protrusion 240 is formed to protrude from an outer surface of the body portion 201 and formed to be smaller than a width of the accommodation space 103. A magnet portion 231 is formed adjacent to the guide protrusion 240. The user may recognize a position at which the magnet portion 231 is disposed and a direction in which the lens module 200 is inserted into the accommodation space 103 by the guide protrusion 240.

The head mounted display 100 according to the present disclosure includes a sensing unit for sensing the insertion of the lens module 200. The sensing unit according to an embodiment includes a first sensing unit mounted on the lens module 200 and a second sensing unit formed on the first frame 101 to sense the presence and movement of the first sensing unit. The first sensing unit of the sensing unit according to an embodiment of the present disclosure may include a magnet portion 231, and the second sensing unit may include a sensor unit 104 for sensing a magnetic change due to the movement of the magnet portion 231. The sensor unit 104 may be implemented with a hall sensor for sensing a magnetic change. The sensor unit 104 is formed on an inner surface of the first frame 101 constituting the accommodation space 103, and preferably disposed to face one surface of the body portion 201 disposed with the magnet portion 231.

Referring to FIGS. 2B and 2C again, the magnet portion 231 is formed in one region of the lens module 200. The magnet portion 231 is disposed in a preset region on the body portion 201 according to a refractive index of the lens 210 of the lens module 200. In other words, the magnet portion mounted on the lens module is disposed in different regions depending on the refractive index of the lens included in the lens module.

When the lens module 200 is inserted into the accommodation space 103, the sensor unit 104 senses a magnetic change of the magnet unit 231 disposed in a specific region of the body portion 101. The sensor unit 104 may sense a different magnetic change to distinguish the magnet portion 231 formed in a different region on the first frame 101. The refractive index of the lens inserted into the first frame 101 may be determined based on the sensing of the magnet portion 231.

A plurality of lens modules 200 provided with lenses having different refractive indices and distinguished from each other may be selectively inserted into the accommodation space 103 of the first frame 101. The shapes of the body portions 201 of the lens module 200 are substantially the same. However, the types of the magnet portions 231 mounted on the body portion 201 are different from each other, and the regions in which the magnet portions 231 are disposed on the body portion 201 are different from each other.

Accordingly, it may be possible to determine what type of lens module is inserted by the sensor unit 104 mounted within the first frame 101.

According to the present embodiment, the user may selectively insert lenses having different refractive indexes into the head mounted display to receive screen information displayed by the display unit 151 as an image at a different viewing angle.

Figure 2D:
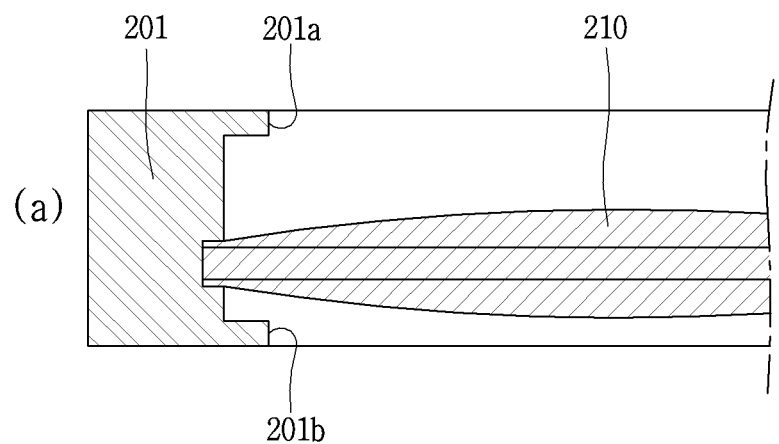
Figure 2D:
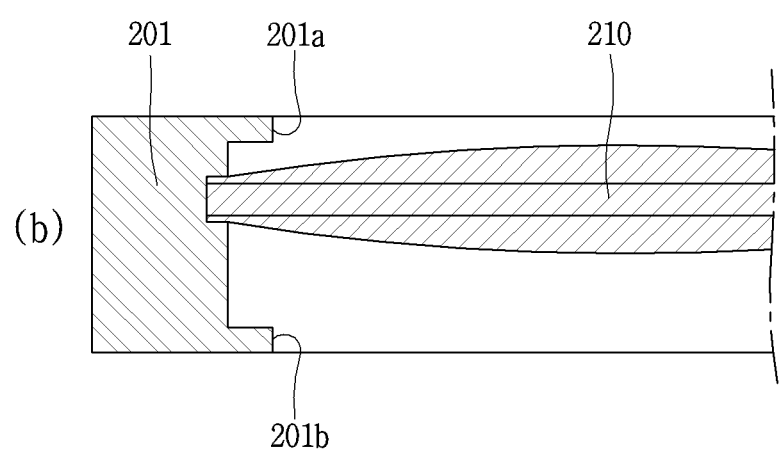
Figure 2E:
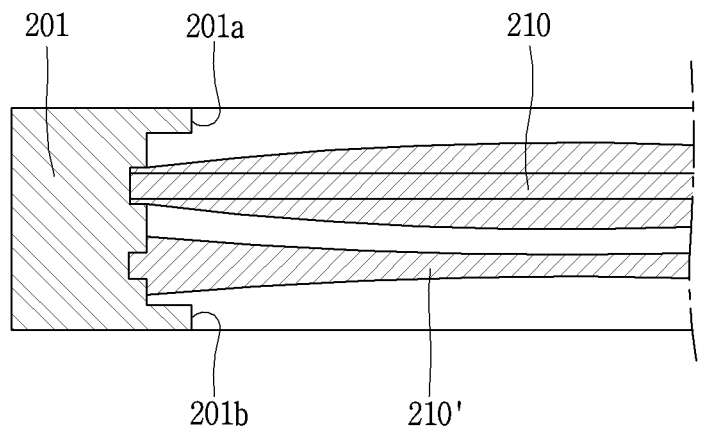

FIGS. 2D and 2E are partial cross-sectional views in which a lens module is taken along a A-A direction of FIG. 2A to describe the lens module according to another embodiment. Referring to FIG. 2D, the lens 210 may be fixed at different positions within the body portion 201. A thickness of the lens 210 of the lens module according to the present embodiment is formed to be smaller than that of the body portion 201.

One surface facing the display unit 151 of the body portion 201 is defined as a front surface 201a, and a region disposed adjacent to the user's eyes (a region away from the display unit 151) is defined as a rear surface 201b.

Referring to FIG. 2D(a), an end portion of the lens 210 may be fixed to a fitting groove formed on an inner surface of the body portion 101. The lens 210 is formed closer to the rear surface 201b than the front surface 201a. Referring to FIG. 2D(b), the lens 210 is formed closer to the front surface 201a than the rear surface 201b.

However, a method of fixing the lens to the body portion 201 is not limited thereto. For example, the lens may be fixed to the body portion 201 by an adhesive member.

FIGS. 2D(a) and 2D(b) may correspond to lens modules distinguished from each other, and may be sensed as lens modules having different lenses by the sensing unit. A focal length of the lens 210 varies as the position of the lens 210 is disposed in different regions within the body portion 201. A slight difference in focal length is generated based on a difference in mounting position of the lens 210 within the body portion 201, and therefore, when fine adjustment is required for the screen information, different lens modules may be inserted.

Although not shown in the drawings, the lens according to an embodiment may be formed to be movable close to the front surface or the rear surface in a state of being mounted on the body portion 201. For example, the body portion may be formed of an elastically deformable material and formed with a plurality of fitting grooves on which the lens is to be mounted.

Accordingly, the user may selectively mount the lens module to change a focal length of screen information.

FIG. 2E is a cross-sectional view for explaining a lens module for vision correction.

The lens module according to FIG. 2E includes a body portion 201, a lens portion 210 made of a convex lens, and a correction lens 210' made of a concave lens. The lens portion 210 and the correction lens 210' are disposed on the body portion 201 to overlap with each other, and both ends thereof may be fixed to the fitting groove or the like in a fitting state.

The correcting lens 210' is formed with of a concave lens, and controls a refractive index of an image with respect to the screen information to be changed. Light forming the image is again refracted by the correction lens 210'. The position where the image is formed may be changed by the correction lens 210', and therefore, even in the case of a user with poor visual acuity, a lens module including the correction lens 210' may be mounted on the head mounted display to view a virtual image of clear screen information without additionally wearing glasses for correcting vision.

A refractive index of the correction lens 210' may be controlled by a user's eyesight, and although not specifically shown in the drawings, the correction lens 210' may be additionally mounted within the body 200. In other words, the body portion 200 may further include an extra fixing space for fixing an additional lens.

According to the present embodiments, a plurality of lenses included in the lens module may provide more enhanced quality screen information through the head mounted display unit by slightly changing an arrangement structure, and provide personalized screen information to the user.

Accordingly, when the head mounted display is used by a plurality of users, the users may mount and use a lens module suitable for his/her eyesight on the first frame.

According to the present embodiments, a lens having a different refractive index according to the screen information displayed on the display unit 151 may be applied to improve the quality of an image sensed by the user.

Figure 3A:
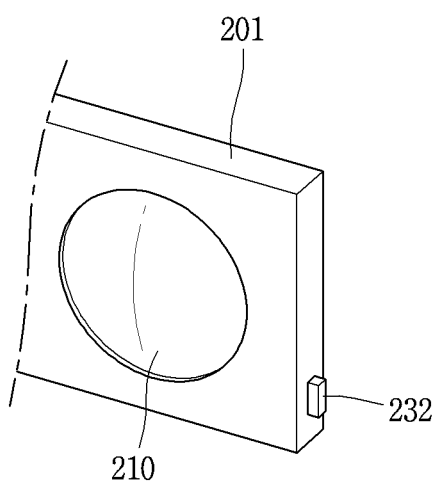
FIGS. 3A and 3B are conceptual views for explaining a sensing unit according to another embodiment.
Figure 3B:
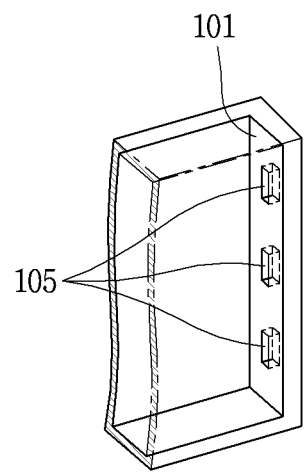

FIGS. 3A and 3B are conceptual views for explaining a sensing unit according to another embodiment. The sensing unit according to the present embodiment includes a pushing protrusion 232 formed on the body portion 201 of the lens module and a button portion 105 formed on the first frame 101. The pushing protrusion 232 is protruded from one region of the body portion 201. The button portion 105 may include a plurality of grooves. On the drawing, three grooves are shown, but the present disclosure is not limited thereto.

The lens module includes the pushing protrusion 232 formed in a region corresponding to a refractive index of the lens 210.

The shapes of the pushing protrusion 232 and the groove are formed in a substantially corresponding manner to insert the pushing protrusion 232 into each of the plurality of grooves. When the lens module is inserted into the accommodation space 103 (refer to FIG. 2B), the pushing protrusion 232 is selectively inserted into any one of the plurality of grooves.

The button portion 105 is disposed with an input member within the groove for generating a control command by the pushing protrusion 232. Although not shown in the drawing, the plurality of input members are connected to a circuit board, and only one input member, which is pressed by the fitting of the lens module, generates a signal.

The controller 180 may identify a groove in which the pushing protrusion 232 is inserted among the plurality of grooves by the plurality of input members. Accordingly, the controller 180 may determine a refractive index of the lens included in the inserted lens module.

Figure 4A:
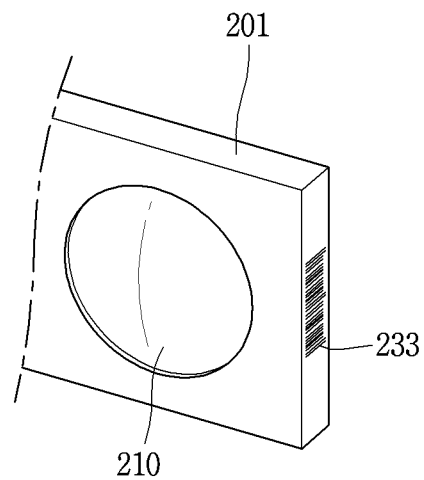
FIGS. 4A and 4B are conceptual views for explaining a sensing unit according to still another embodiment.
Figure 4B:
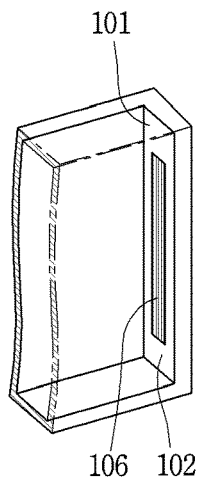

FIGS. 4A and 4B are conceptual views for explaining a sensing unit according to still another embodiment. The sensing unit according to the present embodiment includes a bar code unit 233 formed on the lens module and a sensing unit 106 formed on the first frame 101. A different lens module including a lens having a different refractive index may include a barcode portions 233 with a different shape, and the barcode portion 233 may include information associated with a refractive index of the lens.

The sensing unit 106 may be a reading module capable of sensing the barcode portion 233 and reading information included in the barcode portion 233. According to the present embodiment, the barcode portion 233 does not require an additional mechanical structure, and thus various types of lens modules may be formed.

In other words, the head mounted display according to the present disclosure may recognize information associated with a refractive index of the lens to be mounted. Hereinafter, a control method of a head mounted display including a lens module capable of insertion and withdrawal will be described.

Figure 5A:
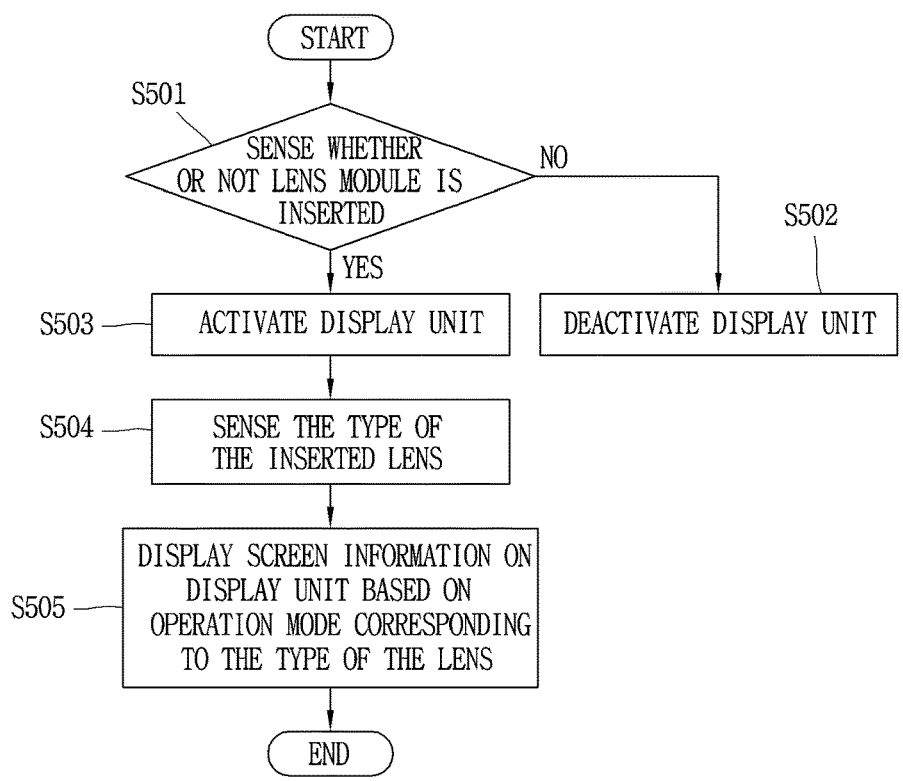
FIG. 5A is a flowchart for explaining a method of controlling a head mounted display according to an embodiment of the present disclosure.
Figure 5B:
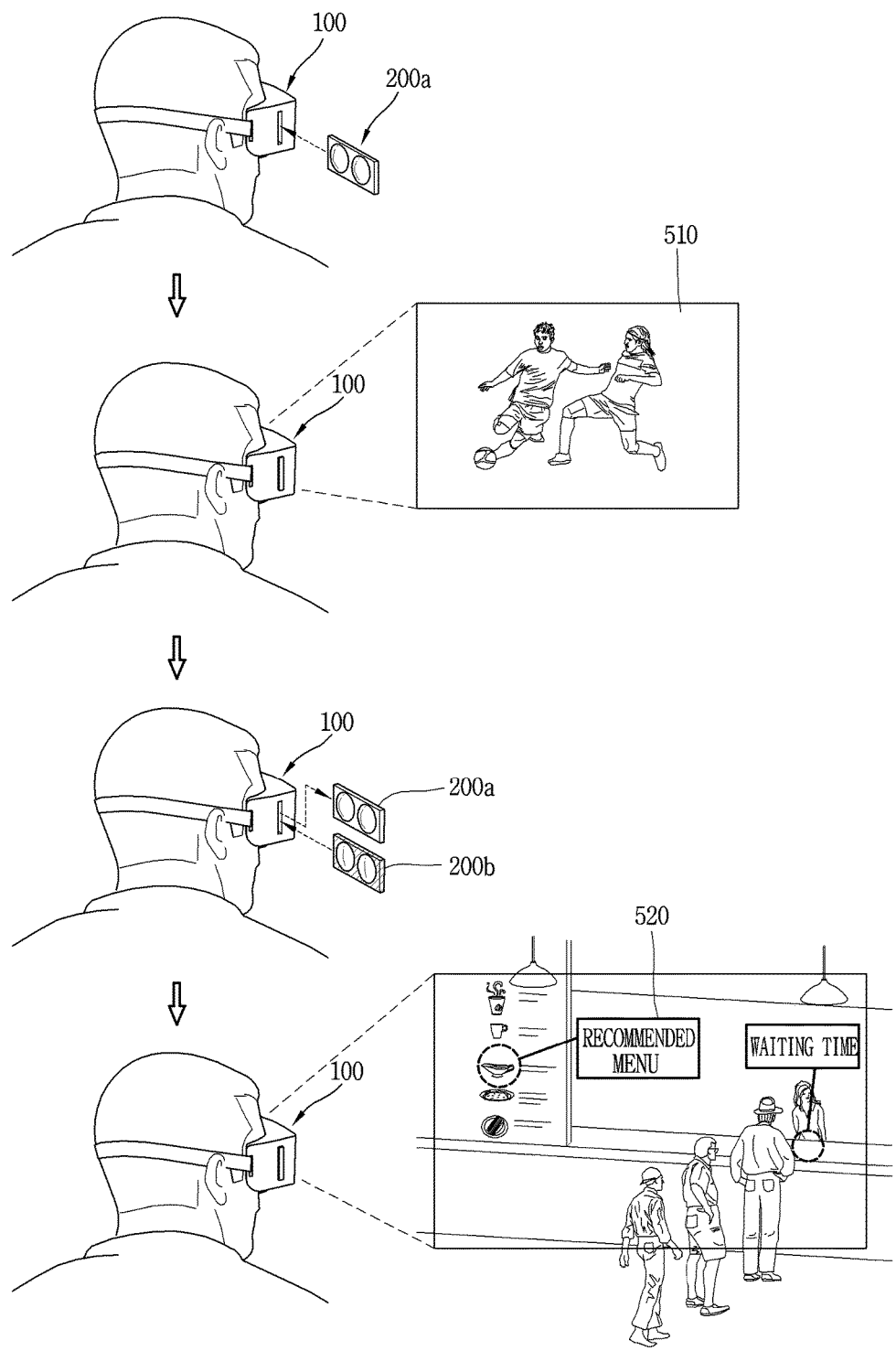
FIG. 5B is a conceptual view for explaining the control method of FIG. 5A.

FIG. 5A is a flowchart illustrating a method of controlling a head mounted display according to an embodiment of the present disclosure, and FIG. 5B is a conceptual view for explaining the control method of FIG. 5A.

The controller 180 senses whether or not the lens module is inserted (S501). For example, when the sensing unit includes the magnet unit 231 and the sensor unit 104, the sensor unit 104 senses a magnetic change when the lens module is inserted. The controller 180 may determine that the lens module is inserted into the first frame 101 based on the magnetic change.

The controller 180 controls the display unit 151 to maintain an inactive state when the magnetic change is not sensed by the sensor unit (S502). For example, even when a specific control command for operating the display unit 151 is applied, the controller 180 restricts the operation of the display unit 151 when it is determined that the lens module is not inserted thereinto. Here, an inactive state of the display unit 151 corresponds to a state in which no visual information is displayed on the display unit 151, and the user is unable to recognize any image.

When it is sensed by the sensor unit that the lens module is inserted, the controller 180 activates the display unit 151 (S503). The controller 180 senses the type of the inserted lens based on the sensing unit (S504).

Here, the type of the lens may include information on a refractive index of a lens mounted on the lens module, a viewing angle according to the refractive index, and a size and a position of an image to be formed.

The controller 180 activates an operation mode corresponding to the type of the lens, and displays screen information based on the operation mode on the display unit 151. Here, the operation mode denotes that a specific function among various functions performed in the head mounted display is executed, and the display unit 151 displays specific screen information based on the operation mode.

For example, the operation mode may include a mode for providing current status information of the head mounted display unit 151, 100, a mode for playing a media file, a mode for displaying an execution screen of an executed application, an augmented reality (AR) mode in which a virtual image is superimposed on a realistic image or background and displayed as a single image.

Screen information displayed by each operation mode may be different from each other, and a number of pixels required for the screen information to be displayed on the display unit 151 may be different. In addition, an appropriate size and an appropriate formation position of an image corresponding to the screen information may be different depending on a function activated in each operation mode.

Referring to FIG. 5B, when it is sensed that the first lens module 200a is inserted, a first operation mode is executed based on the type of the first lens module 200a. For example, a media playback function may be executed by the first operation mode. The display unit 151 displays first screen information based on the first operation mode, and the first screen information is formed as a first image based on the first lens module 200a. The first image corresponds to an enlarged virtual image of the first screen information.

The controller 180 switches the first operation mode to a second operation mode when it is sensed that the second lens module 200b is inserted instead of the first lens module 200a. For example, the second operation mode may correspond to a augmented reality mode. A focal length of the lens included in the second lens module 200b is smaller than that included in the first lens module 200a. In this case, a refractive index of the first lens module 200a is formed to be greater than that of the second lens module 200b.

Second screen information is displayed by the augmented reality mode when the second operation mode is activated. A user may recognize the second image 520 of the second screen information by the second lens module 200b. The second image 520 is larger than the first image 510 and is formed in a region away from the user.

The controller 180 may switch the display unit 151 to an inactive state when the first lens module 510 is separated from the head mounted display 100. Furthermore, when the first lens module 510 or the second lens module 520 is mounted on the head mounted display 100, the controller 180 may immediately operate the operation mode and executes a preset application even when the user's control command is not applied. In other words, the controller 180 recognizes the information of the lens module sensed by the sensing unit as a control command of a specific operation mode (or a specific application).

According to the present disclosure, it is unnecessary to input a control command for activating an operation mode. Also, the operation mode may be activated by the inserted lens module, and thus screen information based on the operation mode may be provided through the lens module having an appropriate focal length.

Figure 6A:
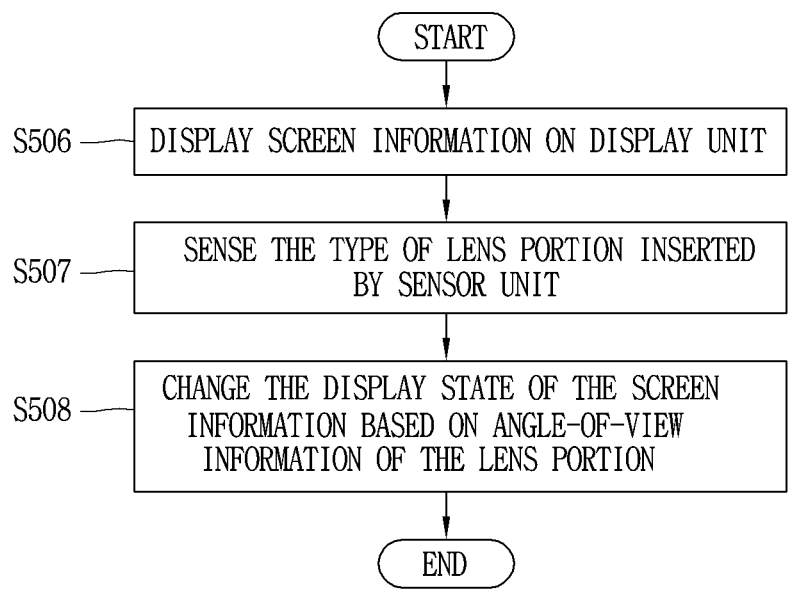
FIG. 6A is a flowchart for explaining a control method of the head mounted display unit 151 according to another embodiment.
Figure 6B:
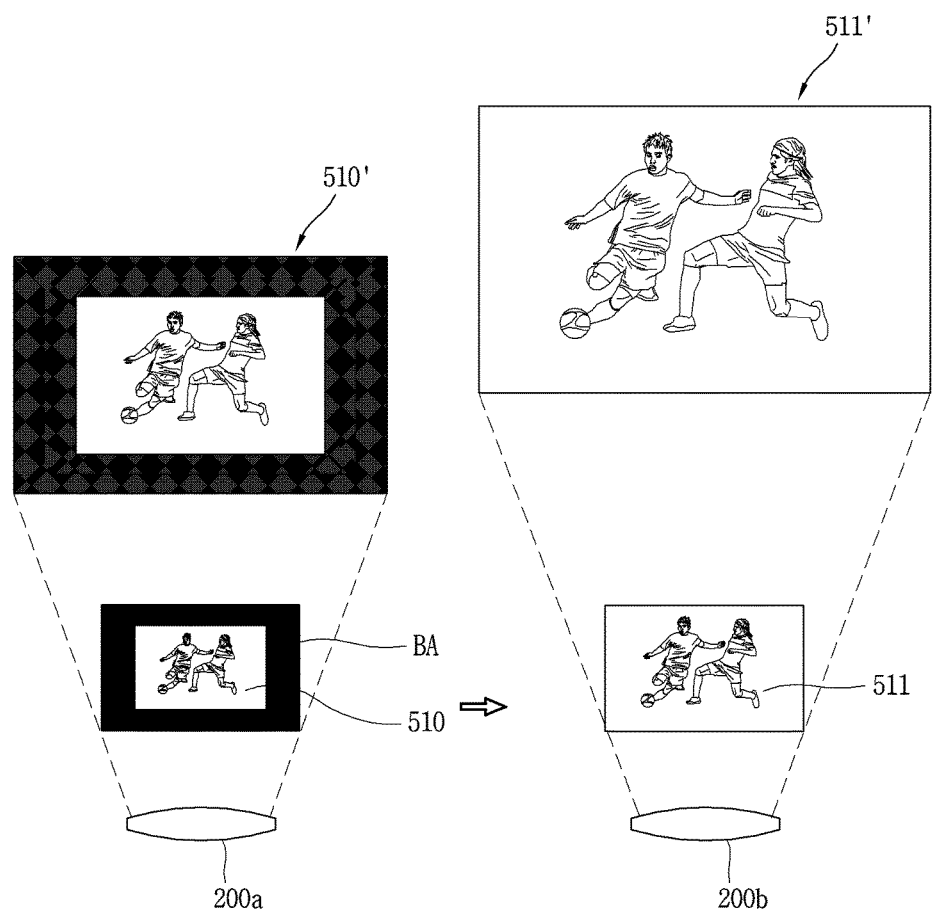
FIG. 6B is a conceptual view for explaining the control method of FIG. 6A.

FIG. 6A is a flowchart for explaining a control method of the head mounted display unit 151 according to another embodiment, and FIG. 6B is a conceptual view for explaining the control method of FIG. 6A.

Screen information is displayed on the display unit 151 (S506). The screen information may correspond to an execution screen of a specific operation mode. While the screen information is being displayed, the sensing unit senses the type of the lens module mounted on the head mounted display 100 (S507).

Referring to FIG. 6B, when a specific function is executed, the display unit 151 displays initial screen information 510. The initial screen information 510 includes a number of pixels corresponding to a region of the display unit 510.

A non-display area (BA) is formed on the display unit 151 for displaying the initial screen information 510. The non-display area (BA) may not include visual information and may be recognized as a specific color (black). The non-display area (BA) may be formed along an edge of the initial screen information 510, but the display state of the non-display area (BA) and the initial screen information 510 is not limited thereto.

When the first lens module 200a is mounted, the display unit 151 displays the screen information 510 on one region thereof, wherein the initial screen information 510 includes a preset number of pixels.

The initial screen information 511 is formed as an initial image 510' by the first lens module 200a inserted into the head mounted display. A virtual image of the non-display area (BA) is formed together with the initial image 510' by the first lens module 200a, and recognized by the user.

While the screen information is imaged and provided to the user, the controller 180 senses the type of the lens module inserted by the sensing unit (S507), and changes the display state of the screen information based on the angle-of-view information of the lens module (S508). The angle-of-view information is formed by a refractive index of the lens provided in the lens module. A size of the image of the screen information and a region where the image is formed are determined based on an angle of view of the lens.

When a lens having a small angle of view is mounted, the display unit displays the screen information including a small number of pixels so that all the screen information is included in the user's field of view.

In case where the refractive indices of the first and second lens modules 200a, 200b are substantially the same, when the resolution of the screen information is improved, the non-display area (BA) on the display unit 151 disappears.

For example, when the first lens module 200a is changed to the second lens module 200b, the controller 180 changes the display state the initial screen information 510 based on an angle of view of the second lens module 200a. For example, the display unit 151 displays the initial screen information 511 as a whole so that there is no non-display area (BA). Here, an angle of view of the second lens module 200b is larger than that of the first lens module 200a.

When the initial screen information 511 is entirely displayed on the display unit 151, it will increase the resolution (PPI, pixel per inch) and improve the picture quality. As the initial screen information 511 is entirely displayed on the display unit 151, the non-display area (BA) is not included in the image 510 as well.

According to the present embodiment, when an angle of view of the lens module is changed in a state where screen information according to a specific function is displayed, it may be sensed to change the display state of the screen information, thereby allowing the user to receive move enhanced quality images.

Figure 7A:
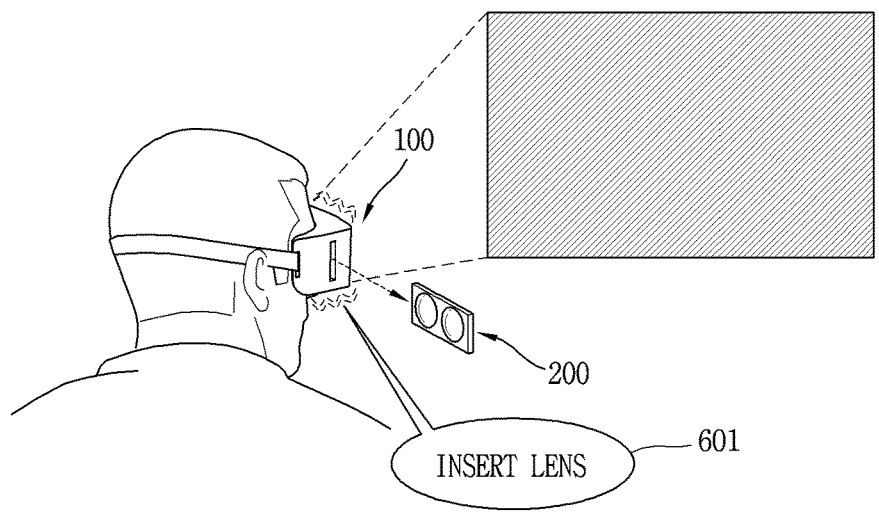
FIGS. 7A through 7C are conceptual views for explaining a control method of a guide notification of mounting a lens module.
Figure 7B:
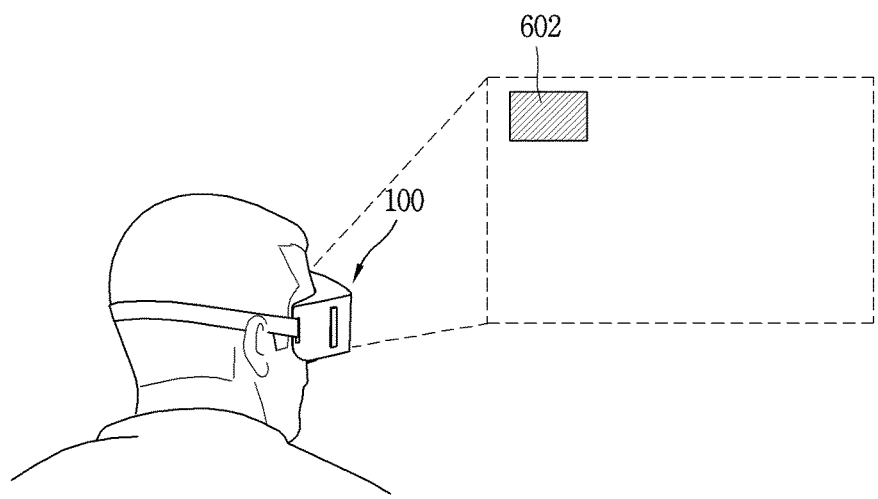
Figure 7C:
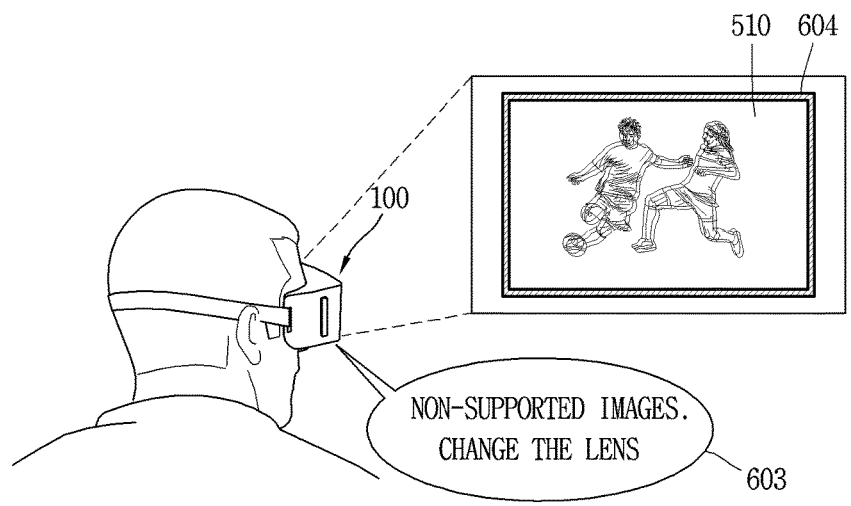

FIGS. 7A through 7C are conceptual views for explaining a control method of a guide notification of mounting a lens module.

Referring to FIG. 7A, when the lens module inserted into the first frame 101 (refer to FIG. 2A) is not sensed, the controller 180 may output notification information for guiding the mounting of the lens module 200.

The notification information is displayed in various forms. For example, the controller 180 may control controls the haptic module 153 to output a vibration indicating the insertion of the lens module or control the audio output unit 152 to output a voice notification 601.

On the other hand, when a refractive index of a lens mounted on the first frame 101 is not suitable for displaying an image of screen information displayed on the display unit 151, the controller 180 may output notification information for guiding the replacement of the lens module.

When the lens module 200 is not mounted on the first frame 101 or a lens module that is not suitable for the screen information is mounted thereon, the controller 180 controls the display unit 151 to block the display of the screen information or display a screen formed with a specific color. Accordingly, it may be possible to prevent the user from being provided with non-refracted image information or an image refracted at an inappropriate magnification.

Referring to FIG. 7B, the controller 180 controls the display unit 151 to display a warning image 602 when the lens module inserted in the first frame 101 (refer to FIG. 2) is inappropriate. For example, it corresponds to a case where the type of the lens module does not correspond to the operation mode or a case where a refractive index of the lens included in the lens module is not suitable for refracting screen information displayed on the display unit 151.

The warning image 602 is displayed in a preset region on the display unit 151 and refracted by the inserted lens module. The warning image 602 is displayed in one region on the display unit 151 that can be refracted by all kinds of lens modules, and preferably corresponds to visual information forming a specific color.

Referring to FIG. 7C, the controller 180 senses the type of the inserted lens module while a specific operation mode is activated to display screen information. The controller 180 controls the display unit 151 to display a warning image 604 when the type of the lens module and the operation mode do not correspond to each other. Here, a case where the type of the lens module and the operation mode are not compatible to each other corresponds to a case where the lens module that is not suitable for forming screen information provided by the operation mode as an image is mounted. In this case, the screen information may be displayed as an image refracted by the inserted lens module.

The warning image 604 may be formed in an edge region of the screen information, and may correspond to visual information having a preset color or may be composed of a character.

Alternatively, the controller 180 may control the audio output unit 152 to output information indicating that the operation mode and the lens module do not correspond to each other as voice information 603.

According to the present embodiment, the user may be provided with more enhanced quality images based on the replacement guide information of the lens module, which is output while receiving an image of screen information by the inserted lens module.

Figure 8A:
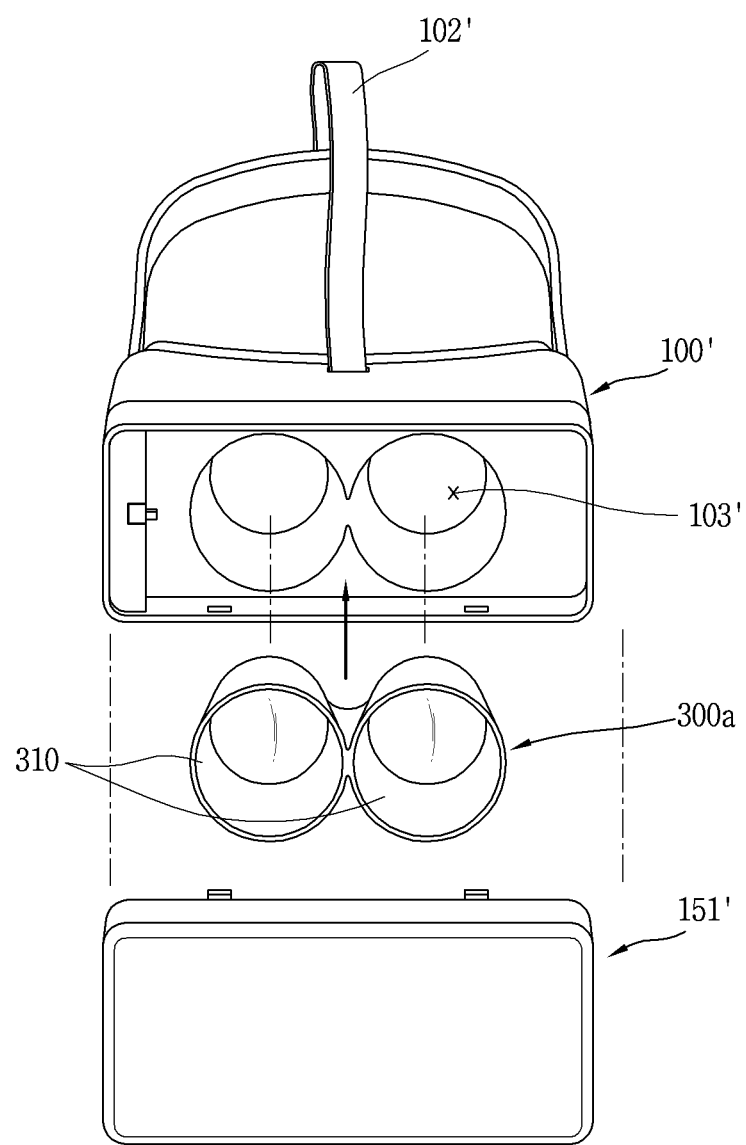
FIGS. 8A and 8B are conceptual views illustrating a head mounted display according to another embodiment.
Figure 8B:
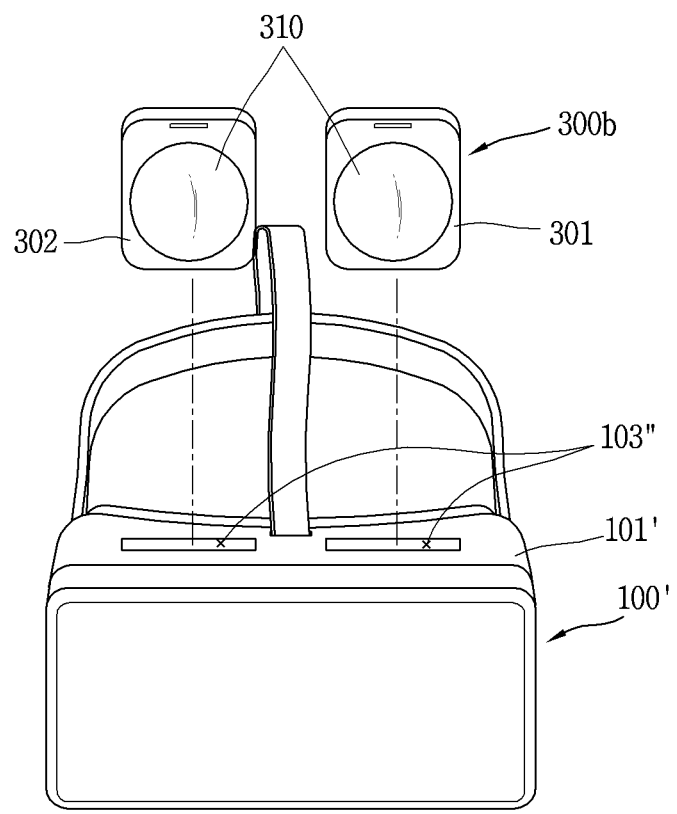

FIGS. 8A and 8B are conceptual views illustrating a head mounted display according to another embodiment. The display units 151, 151' of the head mounted display according to the present embodiment are implemented as a separate mobile terminal. The head mounted display unit 151 includes a first frame 101' on which the mobile terminal is mounted and a second frame 102' fixed on a head of a user. The components constituting the head mounted display 100' according to the present embodiment are substantially the same as the components of the head mounted display of FIG. 2 except for the display portion 151, and thus the redundant description thereof will be omitted.

The lens module 300a according to the present embodiment includes a pair of lenses 310 corresponding to the left and right eyes. The pair of lenses 310 are mounted on a body portion having a preset thickness. The accommodation region 103' has substantially the same shape as the body portion. On the drawing, an edge of the body portion of the lens module 300a has a curved surface, but the shape of the body portion is not limited thereto.

The lens module 300a is formed to fit into the accommodation region 103' exposed after the mobile terminal is separated from the first frame 101'.

Meanwhile, referring to FIG. 8B, the first frame 101 includes a pair of accommodation regions 103". The lens module 300b according to the present embodiment includes first and second body portions 301, 302 and a lens 310 formed on the first and second body portions 301, 302, respectively. The first and second body portions 301, 302 are inserted into the pair of accommodation regions 103", respectively.

The first and second body portions 301, 302 may be formed in a plate shape. A thickness of the lens is preferably formed to be smaller than that of each of the first and second body portions 301, 302, and each lens provided on the first and second body portions 301, 302 may be formed to have a different refractive index.

An opening region is formed on the first frame 101 to communicate with the accommodation region 103" so that the lens module 300b can be inserted. The head mounted display according to the present embodiment may insert the lens module 300b without separating the mobile terminal constituting the display unit 151 from the first frame 101'.

Since the lenses for the left eye and the right eye are separated from the lens module 300b, the user may insert lenses having different refractive indices.

Therefore, when the sights of the user's both eyes are different from each other, a lens module suitable for the sights of both eyes may be inserted.

Although not specifically shown in the drawings, the head mounted display according to the present embodiment includes a sensing unit for sensing that the lens module is inserted into the frame. The sensing unit may sense the type of the lens module as well as the mechanical mounting of the lens module.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the HMD. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

The present embodiments may provide an HMD having a detachable lens module for providing a virtual image at various angles of view, and may be applicable to various industrial fields related thereto.

What is claimed is:

1. A head mounted display, comprising:
a frame formed to be mountable on a head of a user;
a display unit mounted on the frame to display screen information;
a lens module configured to be detachably inserted into the frame, and provided with a pair of lenses having a preset refractive index to form a virtual image of the screen information;
a sensing unit configured to sense the lens module inserted into the frame; and
a controller configured to control the screen information based on a type of the sensed lens module,
wherein the lens module comprises:
a body portion formed to support the pair of lenses and be insertable into an accommodation space of the frame; and
a guide protrusion formed to protrude from an outer surface of the body portion and disposed at one end portion of the body portion to guide an insertion direction of the body portion, and
wherein the guide protrusion is formed adjacent to a magnet portion to guide a direction in which the lens module is inserted into the accommodation space.

2. The head mounted display of claim 1, wherein the sensing unit comprises:
a first sensing module disposed adjacent to the guide protrusion on the body portion; and
a second sensing module mounted on the frame to sense the first sensing module.

3. The head mounted display of claim 2, wherein the first sensing module comprises a magnet portion and the second sensing module comprises a hall sensor for sensing a magnetic change of the magnet portion.

4. The head mounted display of claim 2, wherein the first sensing module comprises a pushing protrusion protruded from one region of the body portion, and
the second sensing module comprises a button portion comprising a plurality of grooves formed to insert the pushing protrusion thereinto.

5. The head mounted display of claim 1, wherein a thickness of the body portion is greater than that of the pair of lenses.

6. The head mounted display of claim 1, wherein an end of the body portion is protruded from an outer surface of the frame in a state where the lens module is inserted into the frame.

7. The head mounted display of claim 1, wherein the display unit is formed to be detachable from the frame, and
wherein the accommodation space of the frame is exposed to the outside in a state where the display unit is separated from the frame and formed to accommodate the lens module.

8. The head mounted display of claim 1, wherein the body portion comprises first and second bodies supporting the pair of lenses, respectively, and
wherein the frame comprises an opening region formed to insert the first and second bodies, respectively.

9. The head mounted display of claim 1, wherein the pair of lenses comprise convex lenses for forming the virtual image of the screen information, and
wherein the lens module further comprises concave lenses that overlap with the convex lenses to adjust a focal distance of the virtual image.

10. The head mounted display of claim 1, wherein the controller switches the display unit to an inactive state when the lens module is not sensed.

11. The head mounted display of claim 10, wherein when the lens module is inserted, the controller activates an operation mode selected based on a refractive index of a lens included in the lens module among a plurality of operation modes that perform different functions.

12. The head mounted display of claim 10, wherein the controller controls the display unit to change a resolution of the screen information in a state where the lens module is inserted.

13. The head mounted display of claim 12, wherein when an angle of view of the lens module increases, the display unit increases a number of pixels forming the screen information.

14. The head mounted display of claim 1, further comprising:
an output unit configured to output warning information when the lens module is not sensed.

15. The head mounted display of claim 1, wherein the lens module is disposed to locate the display unit within a focal distance of the lenses.

16. The head mounted display of claim 4, wherein the pushing protrusion is formed in a region corresponding to a refractive index of the lenses.

17. The head mounted display of claim 7, wherein the guide protrusion is formed to be less than a width of the accommodation space.

18. The head mounted display of claim 14, wherein the controller controls to output a vibration indicating the insertion of the lens module using a haptic module, and output a voice notification indicating the insertion of the lens module using an audio output unit.

* * * * *